No. 609,900. Patented Aug. 30, 1898.
W. NEIL.
PHOTOGRAPHIC NEGATIVE WASHER.
(Application filed May 23, 1898.)
(No Model.)
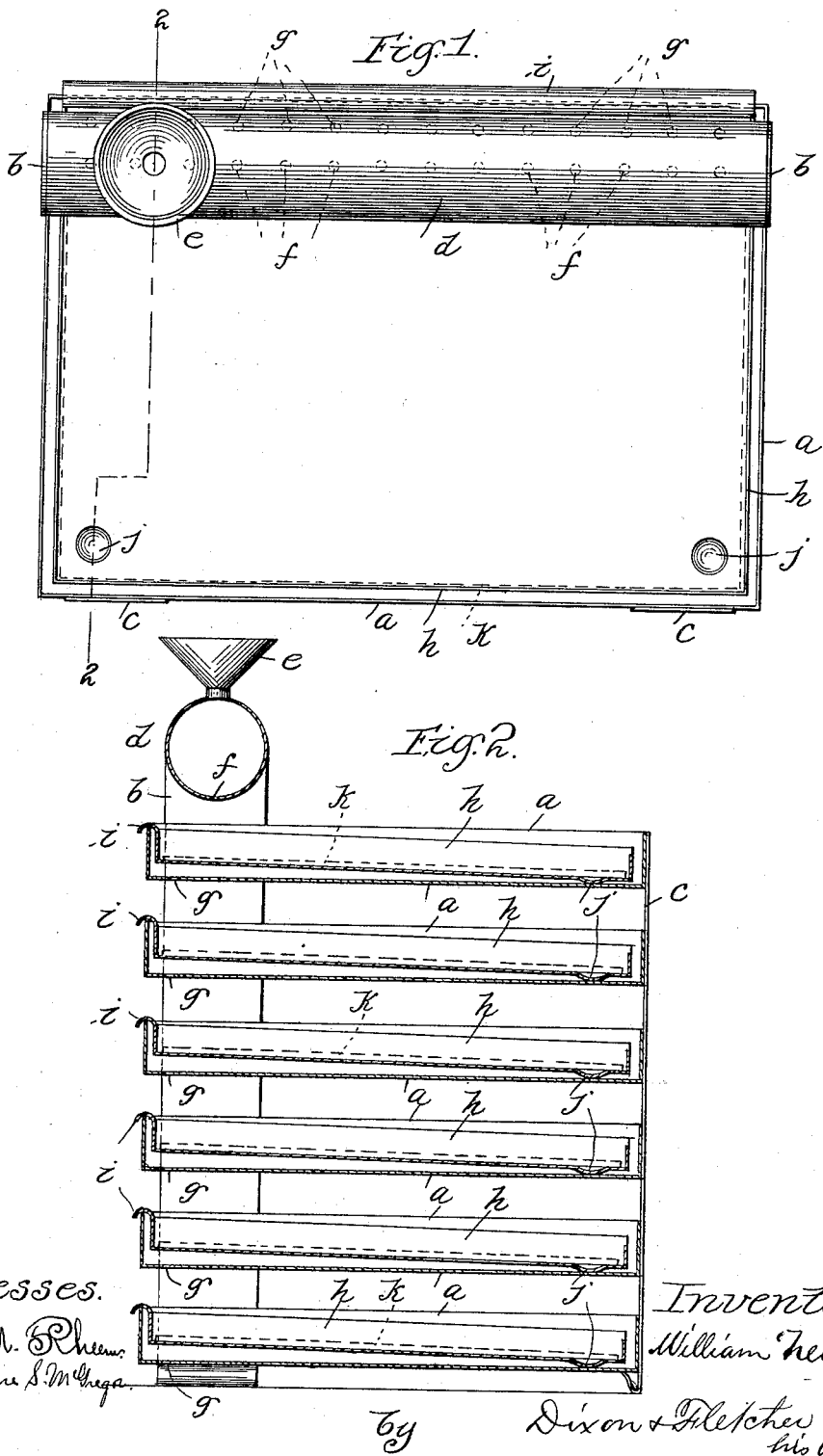
Witnesses.
Inventor
William Neil,
by Dixon & Fletcher
his Att'ys.

UNITED STATES PATENT OFFICE.

WILLIAM NEIL, OF CHICAGO, ILLINOIS, ASSIGNOR TO JAMES H. SMITH, OF SAME PLACE.

PHOTOGRAPHIC-NEGATIVE WASHER.

SPECIFICATION forming part of Letters Patent No. 609,900, dated August 30, 1898.

Application filed May 23, 1898. Serial No. 681,449. (No model.)

*To all whom it may concern:*

Be it known that I, WILLIAM NEIL, of Chicago, in the county of Cook and State of Illinois, have invented certain new and useful Improvements in Apparatus for Washing Photographic Negatives, of which the following is a full, clear, and exact description, reference being had to the accompanying drawings, forming a part of this specification, in which corresponding letters of reference in the different figures indicate like parts.

The object of my invention is to provide a simple and effective apparatus for washing photographic negatives in which the negatives may be kept in separate compartments and subjected to a continuous, uniform, and gentle flow of water. Moreover, it is my purpose to so construct said apparatus that the negatives may be inserted therein or removed therefrom independently of each other and without interfering with the flow of water, each of said negatives being completely submerged during the process of washing.

To these ends my invention consists in the combination of elements hereinafter more particularly described, and specifically pointed out in the claims.

In the drawings, Figure 1 is a plan view of my improved apparatus; and Fig. 2 is a central vertical sectional view thereof, taken upon the line 2 2, Fig. 1.

Referring to the drawings, $a$ represents a series of shallow horizontal trays, preferably made from sheet metal, which are supported in tiers, one above the other, by means of vertical standards $b$ $b$ and $c$ $c$, so that the outer walls of all of said trays coincide, to which uprights said trays are soldered or otherwise rigidly attached. All of said standards are preferably extended somewhat below the bottom tray, as shown, and the standards $b$ $b$ are extended above the top of the topmost tray. Upon the upper ends of said standards is rigidly attached a hollow cylindrical receptacle $d$, preferably formed of sheet metal, upon the top of which and communicating therewith, as shown, is a funnel $e$. The part $d$, which is intended to form a water-distributer, is provided with a series of perforations $f$ in the bottom thereof, as shown in Fig. 2 and indicated in dotted lines in Fig. 1. Each of the trays $a$, except the bottom one, is provided with a series of perforations $g$, extending in a line along one side of the apparatus, preferably the front, and each of said trays is provided with a removable negative-holding tray $h$, having an area enough smaller than that of the tray to permit the latter to be readily inserted therein and removed therefrom. Each of the negative-holding trays $h$ is made shallower than the stationary tray intended to receive it and is provided upon one side with an outwardly-flaring rim or flange $i$, the latter being intended to engage and rest upon the top of the side wall of the tray $a$, as clearly shown in the drawings. The flanges $i$ are intended to extend somewhat above the upper edges of the side walls of the removable trays, but are of such a height that when the removable trays are inserted in place, as shown in Fig. 2, one side is supported at the side walls of the receiving-tray in such a manner as to cause the bottom of the removable tray to be slightly inclined, the lower portion being upon the opposite side from the suspending flange.

I prefer to provide some means for raising each of the removable trays somewhat above the bottom of the receiving-trays, so as to leave a slight space between the two in order to permit the water to flow freely for the purpose hereinafter stated. This separation may readily be accomplished by placing ledges or shoulders or any well-known form of rests in the bottoms of the stationary trays to support the corresponding ends of the receiving-trays; but I prefer to accomplish this result by means of indentations $j$ formed in the bottoms of the removable trays, which indentations may be made to perform a double purpose—namely, the separation of the bottoms of the two trays and also to provide a space for the insertion of the finger of the operator beneath the corner of the negative to enable the same to be more readily removed therefrom.

Having thus described the construction of my improved apparatus, I will now explain its operation. The negatives $k$ being placed in the respective negative-holding trays, the water is admitted from a faucet to the funnel $e$, from whence it flows into the tubular chamber $d$ and out through the openings $f$, being thus distributed throughout the length of the negative. Having filled the topmost tray $h$, it overflows at the lower end into the top tray $a$, from whence it escapes through the openings $g$ at the opposite side to the next negative-holding tray below. The operation is repeated and continued throughout the series of trays until the lower one is reached, when it is obvious that the water will overflow the bottom stationary tray $a$ into a sink or other suitable conduit or receptacle, as may be provided therefor.

My improved device forms a simple, cheap, compact, and rigid construction, an important feature of which is that all the negative-holding trays may be removed from the same side, and inasmuch as the walls of the stationary trays coincide or are in the same vertical planes the apparatus is rendered very compact.

Instead of placing the uprights $c$ upon the rear side, as shown, it is obvious that they may be placed at the ends in the same relative position as the apparatus $b$. This would enable the removable trays to be inserted from either front or rear, as preferred; but in case such a change were to be made it is obvious that the openings $g$ in the bottoms of the permanent trays should be changed correspondingly.

Having thus described my invention, I claim—

1. The combination in a negative-washing apparatus, of a series of stationary trays supported in substantially horizontal positions one above the other in a rigid framework, said trays being provided with perforations in the bottom and adjacent to one of the side walls, a series of removable negative-holding trays adapted to rest within said stationary trays and means for raising the bottoms of the removable trays so as to provide a space between them and the stationary trays, substantially as described.

2. In a device of the class described, the combination of a plurality of substantially horizontal trays each having bottom perforations adjacent to one of its side walls, said trays being secured one above the other in a rigid framework, and a series of removable negative-holding trays of lesser depth than said stationary trays and adapted to be contained within the latter, substantially as described.

3. A negative-washing apparatus in which is combined a plurality of substantially horizontal trays each having bottom perforations adjacent to one of its side walls, said trays being supported one above the other in a rigid framework, and a series of removable negative-holding trays each having a flange extending from the top of one of its sides adapted to engage and overhang the side wall of one of said stationary trays, substantially as described.

4. A negative-washing apparatus in which is combined a plurality of substantially horizontal trays each having bottom perforations adjacent to one of its side walls, said trays being supported one above the other in a rigid framework, a series of removable negative-holding trays adapted to be contained within said stationary trays, means for providing a space between the bottoms of the stationary and removable trays, and means for suspending one side of each of the removable trays to one of the side walls of the stationary trays, substantially as described.

5. In a device of the class described, the combination of a plurality of substantially horizontal trays each having bottom perforations adjacent to one of its side walls, said trays being supported one above the other in a rigid framework, a series of removable negative-holding trays adapted to be contained within said stationary trays, flanges upon one of the side walls of said removable trays for engaging one of the side walls of said stationary trays, and indentations in the bottoms of said removable trays adjacent to the walls opposite to said flanged walls, substantially as described.

6. In a device of the class described, the combination of a plurality of substantially horizontal trays each having bottom perforations adjacent to one of its side walls, said trays being supported one above the other in a rigid framework, a series of removable negative-holding trays adapted to be contained within said stationary trays, flanges upon one of the side walls of said removable trays for engaging one of the side walls of said stationary trays, indentations in the bottoms of said removable trays adjacent to the walls opposite to said flanged walls, and means for introducing and distributing water to the topmost removable tray, substantially as described.

In testimony whereof I have signed this specification, in the presence of two subscribing witnesses, this 30th day of April, 1898.

WILLIAM NEIL.

Witnesses:
D. H. FLETCHER,
JOSEPHINE S. MCGREGOR.